United States Patent
Takemura

(10) Patent No.: US 9,287,557 B2
(45) Date of Patent: Mar. 15, 2016

(54) METHOD FOR MANUFACTURING NONAQUEOUS ELECTROLYTE SECONDARY BATTERY

(75) Inventor: Yasuhiko Takemura, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 591 days.

(21) Appl. No.: 13/339,604

(22) Filed: Dec. 29, 2011

(65) Prior Publication Data

US 2012/0177843 A1   Jul. 12, 2012

(30) Foreign Application Priority Data

Jan. 7, 2011   (JP) .................. 2011-002257

(51) Int. Cl.
| | |
|---|---|
| *B05D 5/12* | (2006.01) |
| *H01M 4/1397* | (2010.01) |
| *H01M 4/04* | (2006.01) |
| *H01M 4/36* | (2006.01) |

(Continued)

(52) U.S. Cl.
CPC .......... *H01M 4/1397* (2013.01); *H01M 4/0404* (2013.01); *H01M 4/366* (2013.01); *H01M 4/5825* (2013.01); *H01M 4/625* (2013.01); *Y02E 60/122* (2013.01)

(58) Field of Classification Search
CPC ............ H01M 200/0094; H01M 4/00; H01M 2300/0002; Y02E 60/122
USPC ........... 429/322, 231.9, 231.95; 427/550, 547
See application file for complete search history.

(56) References Cited

U.S. PATENT DOCUMENTS 5,952,126 A * 9/1999 Lee et al. .................. 429/314
7,390,472 B1   6/2008 Singhal et al.

(Continued)

FOREIGN PATENT DOCUMENTS

| JP | 11-025983 | 1/1999 |
| JP | 2004-079276 | 3/2004 |

(Continued)

OTHER PUBLICATIONS

Liang et al., "Anisotropy in magnetic properties and electronic structure of single-crystal LiFePO$_4$,", *Physical Review B*, vol. 77, 2008, pp. 064414-1-064414-12.

(Continued)

*Primary Examiner* — Michael Cleveland
*Assistant Examiner* — Tabassom Tadayyon Eslami
(74) *Attorney, Agent, or Firm* — Nixon Peabody LLP; Jeffrey L. Costellia

(57) ABSTRACT

When an active material with low ionic conductivity and low electric conductivity is used in a nonaqueous electrolyte secondary battery such as a lithium ion battery, it is necessary to reduce the sizes of particles; however, reduction in sizes of particles leads to a decrease in electrode density. Active material particles of an oxide, which include a transition metal and have an average size of 5 nm to 50 nm, are mixed with an electrolyte, a binder, and the like to form a slurry, and the slurry is applied to a collector. Then, the collector coated with the slurry is exposed to a magnetic field. Accordingly, the active material particles aggregate so that the density thereof increases. Alternatively, the active material particles may be applied to the collector in a magnetic field. The use of the aggregating active material particles makes it possible to increase the electrode density.

12 Claims, 4 Drawing Sheets

(51) Int. Cl.
*H01M 4/58* (2010.01)
*H01M 4/62* (2006.01)

(56) References Cited

U.S. PATENT DOCUMENTS

| | | | |
|---|---|---|---|
| 7,718,314 | B2 | 5/2010 | Komiyama et al. |
| 8,518,584 | B2 | 8/2013 | Kawamoto et al. |
| 2003/0196898 | A1* | 10/2003 | Tominaga et al. ............ 204/508 |
| 2004/0096743 | A1 | 5/2004 | Okae et al. |
| 2005/0019656 | A1 | 1/2005 | Yoon et al. |
| 2005/0142353 | A1* | 6/2005 | Buczek et al. ................ 428/323 |
| 2005/0221188 | A1* | 10/2005 | Takami et al. ........... 429/231.95 |
| 2006/0222952 | A1 | 10/2006 | Kono et al. |
| 2007/0276217 | A1 | 11/2007 | Brown et al. |
| 2008/0248382 | A1 | 10/2008 | Sastry et al. |
| 2008/0268339 | A1 | 10/2008 | Suzuki |
| 2009/0202915 | A1 | 8/2009 | Modeki et al. |
| 2010/0163790 | A1 | 7/2010 | Ceder et al. |
| 2011/0195310 | A1* | 8/2011 | Kawamoto et al. ........ 429/231.3 |
| 2011/0289790 | A1* | 12/2011 | Kazama et al. ................ 34/247 |
| 2012/0058397 | A1* | 3/2012 | Zhamu et al. .............. 429/231.8 |
| 2012/0107695 | A1* | 5/2012 | Lee et al. ...................... 429/314 |
| 2012/0177842 | A1 | 7/2012 | Mikami et al. |

FOREIGN PATENT DOCUMENTS

| | | | |
|---|---|---|---|
| JP | 2006-127823 | * | 5/2006 |
| JP | 2006-127823 | A | 5/2006 |
| JP | 2006-252945 | | 9/2006 |
| JP | 2007-103339 | | 4/2007 |
| JP | 2011-165404 | A | 8/2011 |
| WO | WO 2006-027925 | A2 | 3/2006 |

OTHER PUBLICATIONS

Zhou et al., "The Li intercalation potential of $LiMPO_4$ and $LiMSiO_4$ olivines with M = Fe, Mn, Co, Ni", *Electrochemistry Communications*, vol. 6, No. 11, 2004, pp. 1144-1148.

Kang et al., "Battery materials for ultrafast charging and discharging", *Nature*, Mar. 12, 2009, vol. 458, No. 12, pp. 190-193.

* cited by examiner ial properties of lithium iron phosphate have been researched and the magnetic properties of a single crystal of lithium iron phosphate have been studied (see Non-Patent Document 1). According to Non-Patent Document 1, lithium iron phosphate is a paramagnetic substance at room temperature and has high magnetic susceptibility of the (010) direction.

METHOD FOR MANUFACTURING NONAQUEOUS ELECTROLYTE SECONDARY BATTERY

BACKGROUND OF THE INVENTION

1. Field of the Invention

The present invention relates to a nonaqueous electrolyte secondary battery, in particular, a lithium ion secondary battery (hereinafter simply referred to as a lithium ion battery).

2. Description of the Related Art

As secondary batteries with large power storage capacity, lithium ion batteries are mounted not only on small portable electric devices but also on electric vehicles and the like these days. For positive electrodes of lithium ion batteries, lithium cobaltate ($LiCoO_3$) has been conventionally used.

However, cobalt is a scarce resource; thus, secondary batteries including $LiCoO_2$ or the like as positive electrode active materials are difficult to mass-produce and increase in size in order to be used as electric vehicle batteries and the batteries are inevitably highly expensive. For this reason, attempts have been made to use, instead of cobalt, a lithium-iron composite oxide having an olivine structure and including iron that is an inexpensive abundant resource as its main constituent element (e.g., lithium iron phosphate ($LiFePO_4$)) and a lithium-manganese composite oxide (e.g., lithium manganese phosphate ($LiMnPO_4$)) as positive electrode active materials (see Patent Document 1).

In addition, the physical properties of lithium iron phosphate have been researched and the magnetic properties of a single crystal of lithium iron phosphate have been studied (see Non-Patent Document 1). According to Non-Patent Document 1, lithium iron phosphate is a paramagnetic substance at room temperature and has high magnetic susceptibility of the (010) direction.

REFERENCE

[Patent Document 1] Japanese Published Patent Application No. 2004-079276
[Non-Patent Document 1]
G. Liang et al., "Anisotropy in magnetic properties and electric structure of single-crystal $LiFePO_4$", Phys, Rev. B77 (2008) 064414.

SUMMARY OF THE INVENTION

However, lithium iron phosphate has lower electric conductivity and lower ionic conductivity than lithium cobaltate, and accordingly, batteries including lithium iron phosphate are inferior to those including lithium cobaltate in characteristics. To solve these problems, it is necessary to reduce the sizes of particles of lithium iron phosphate to shorten paths from the particles to an electrolyte, through which electrons and ions transfer. Specifically, the average value of the sizes of the particles (the size of a particle in this specification refers to the cube root of the volume of the particle) needs to be 50 nm or less, preferably 20 nm or less.

Unfortunately, there is a problem that in the case of using such fine particles, the density of an active material cannot be increased. This is because the surfaces of the particles are activated when the sizes of the particles are in the range of 50 nm or less. For example, when comparing an aggregate of particles (powder) each with a weight of 1 g and a size of 1 μm and an aggregate of particles each with a weight of 1 g and a size of 10 nm, the latter needs to have volume five or more times as large as that of the former, which means that the density (i.e., the electric capacity) of an electrode is reduced in the case where fine active material particles are used for the electrode.

A feature of the present invention is that a characteristic of displaying paramagnetism, ferromagnetism, or antiferromagnetism of an olivine-type oxide including a transition metal is utilized to make powder aggregate and obtain a high-density electrode. For example, active material particles of the olivine-type oxide are formed over a collector in a magnetic field of 0.01 T to 2 T so as to aggregate over the collector. Such aggregation in a magnetic field is preferably applied to, in general, a material with high magnetic susceptibility as well as the olivine-type oxide.

That is to say, one embodiment of the present invention is a method for manufacturing a nonaqueous electrolyte secondary battery, which includes the following steps: mixing an electrolyte, a binder, and active material particles of an oxide, which include a transition metal and have an average size of 5 nm or more and 50 nm or less, to form a slurry; applying the slurry to a collector; and exposing the collector coated with the slurry to a magnetic field of 0.01 T to 2 T.

Another embodiment of the present invention is a method for manufacturing a nonaqueous electrolyte secondary battery, which includes the following steps: mixing an electrolyte, a binder, and active material particles of an oxide, which include a transition metal and have an average size of 5 nm or more and 50 nm or less, to form a slurry; and applying the slurry to a collector in a magnetic field of 0.01 T to 2 T.

In the above structure, the average size of the active material particles is preferably 5 nm to 20 nm. Further, it is the most ideal that each of the active material particles consists of a single crystal (one crystal). Note that, practically, not all the active material particles need to consist of single crystals, but 60% or more of the active material particles preferably consist of single crystals. The surfaces of the active material particles may be coated with carbon.

The above description relates to a lithium ion battery, but can also be applied to general nonaqueous electrolyte secondary batteries. With the above structure, the power extraction efficiency of a nonaqueous electrolyte secondary battery can be improved. The improvement in power extraction efficiency means an increase in power storage capacity, and thus, the nonaqueous electrolyte secondary battery is suitable for applications where a large amount of power is needed even temporarily.

For example, a power source of an electric vehicle consumes a relatively small amount of power when the electric vehicle is driven on the flat ground. In contrast, a large amount of power is consumed under hard acceleration or in ascending a slope. In that case, the power source needs to feed a large amount of current; however, if the power extraction efficiency is low, internal resistance increases and a significant voltage drop and a loss due to internal resistance are caused.

As a result, part of the power which is expected to be available is lost under such a situation. For example, when a secondary battery is used as a power source, although stored power can be almost fully used if the vehicle is driven on the flat ground, part of the power is lost in ascending a slope or under acceleration. An improvement in the power extraction efficiency can suppress such a loss.

In a positive electrode manufactured by the above method, the distance between active material particles is shortened so that the density of an active material can be increased (that is, the power storage capacity can be increased). Note that higher magnetic susceptibility of the active material facilitates an increase in density of powder due to a magnetic field.

To implement one embodiment of the present invention, active material particles 102 (which may be coated with carbon) dispersed in an electrolyte 101 (which includes a binder and a conduction auxiliary agent) are applied to a Collector 103 as illustrated in FIG. 1A. Here, eight active material particles (A to H) are illustrated. The collector 103 is preferably a paramagnetic substance with low magnetic susceptibility, such as aluminum. At this stage, the active material particles have random orientations.

As described above, when the active material particle has a size of 50 nm or less, the distance between the particles increases, which leads to a reduction in density of the active material. For example, when the size of the particle is 1 µm, the amount of the electrolyte may be only 10% or less of that of the active material. On the other hand, when the size of the particle is 20 nm or less, the amount of the electrolyte needs to be larger than or equal to that of the active material.

Next, application of a magnetic field with an intensity in the above range to the active material particles 102 causes the active material particles 102 to be attracted to the collector 103. It is particularly preferable to use a gradient magnetic field. Further, when the active material does not have anisotropic magnetic susceptibility, the particles are arranged so that the longitudinal directions thereof correspond to the directions of the magnetic field. Thus, the active material particles 102 densely aggregate over the collector 103.

Active material particles aggregating in such a manner can keep the state even after a magnetic field disappears. Therefore, the active material particles formed over a collector having a large area can be made to aggregate by moving a means for generating a magnetic field with a limited size, such as a permanent magnet or an electromagnet, below and along the bottom surface of the collector.

For example, when a means for generating a magnetic field is moved from left to right below and along the bottom surface of the collector 103 as illustrated in FIGS. 2A and 2B, the active material particles 102 start to aggregate from the left side and can finally aggregate almost completely.

At this time, the bottom surface of the collector 103 may be scanned with the use of long lengths of means for generating a magnetic field 106 as illustrated in FIG. 3A. Since the means for generating a magnetic field 106 is sufficiently smaller than the collector 103, as illustrated in FIG. 3B, a magnetic field has non-uniform intensity: the intensity of a magnetic field is the highest in the vicinity of the center of the surface of the means for generating a magnetic field 106, from which a magnetic field is generated, and decreases toward the peripheral portion. In addition, the directions of a magnetic field also vary as shown by lines of magnetic force 107.

That is to say, a magnetic field has gradient intensity. Thus, the active material particles 102 in the vicinity of an outer layer of the electrolyte 101 more easily aggregate in the vicinity of the top surface of the collector 103 because a magnetic field closer to the means for generating a magnetic field is more intense. At this time, the intensity of a magnetic field on the top surface of the collector 103 is preferably 0.01 T to 2 T.

Note that once the active material particles 102 aggregate in the vicinity of the top surface of the collector 103, the position thereof does not change even when the intensity or the direction of a magnetic field varies later, unless otherwise the active material particles 102 themselves generate a magnetic field.

In contrast, in the case where the intensity of a magnetic field is not gradient at all (in the case of a parallel magnetic field), the active material particles 102 change the orientations thereof according to the anisotropy of the magnetic susceptibility thereof so that the crystallographic axes are aligned (oriented) in one direction; however, it is difficult to make the active material particles 102 aggregate. This is because in the case where a magnetic field does not have gradient intensity, the active material particles 102 are not energetically stabilized by changing the positions thereof.

Reduced in temperature, the active material particles 102 have higher magnetic susceptibility and thus aggregate more easily while the viscosity of the electrolyte 101 is changed.

As a result of the above process, the distance between the active material particles 102 is shortened and an electrolyte solution 105 in an upper layer is not needed, so that the electrolyte solution 105 in the upper layer is preferably removed. Consequently, a positive electrode 104 illustrated in FIG. 1C can be obtained. The positive electrode 104 has a sufficiently high density and high power extraction efficiency.

BRIEF DESCRIPTION OF THE DRAWINGS

In the accompanying drawings.

DETAILED DESCRIPTION OF THE INVENTION

Figure 1A:
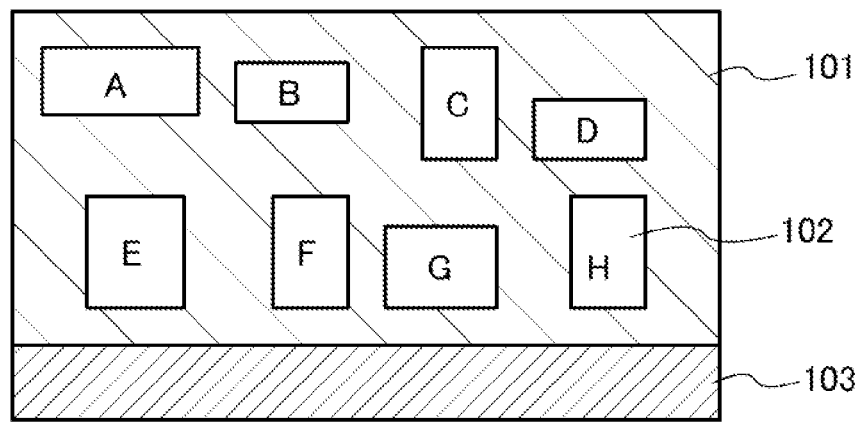
FIGS. 1A to 1C illustrate a method for aggregating active material particles.
Figure 1B:
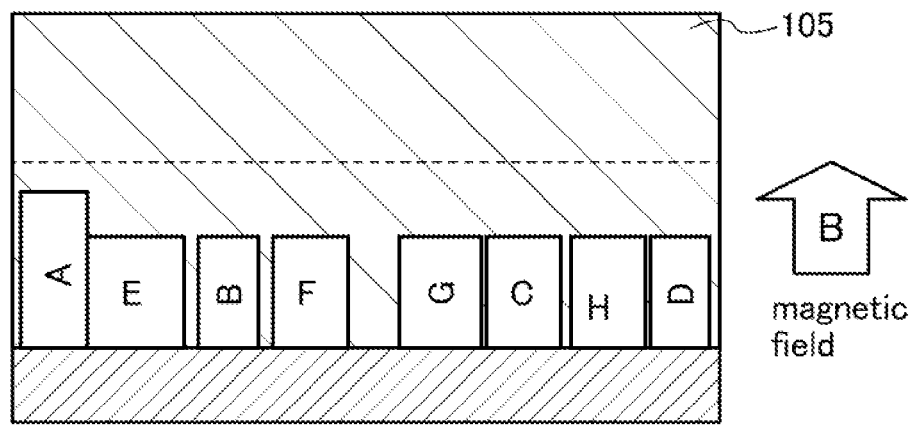
Figure 1C:
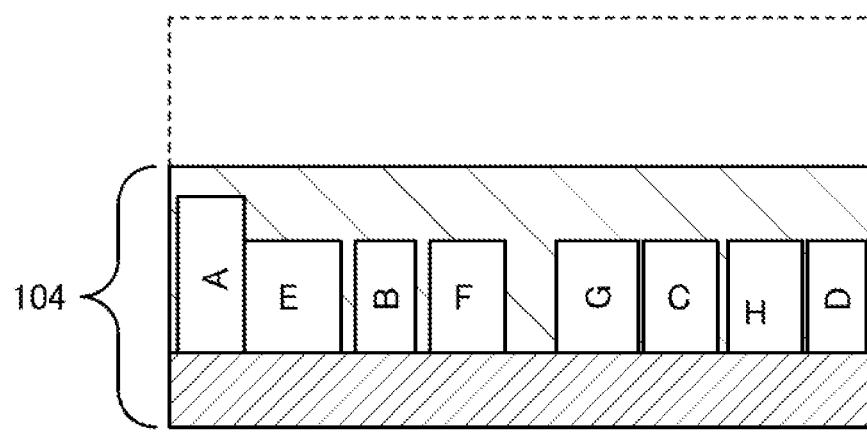
Figure 2A:
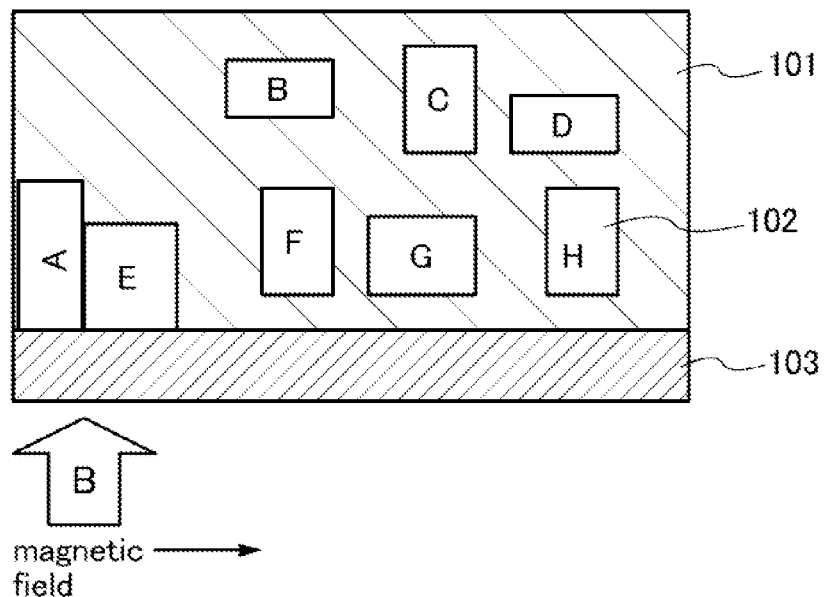
FIGS. 2A to 2C illustrate a method for aggregating active material particles.
Figure 2B:
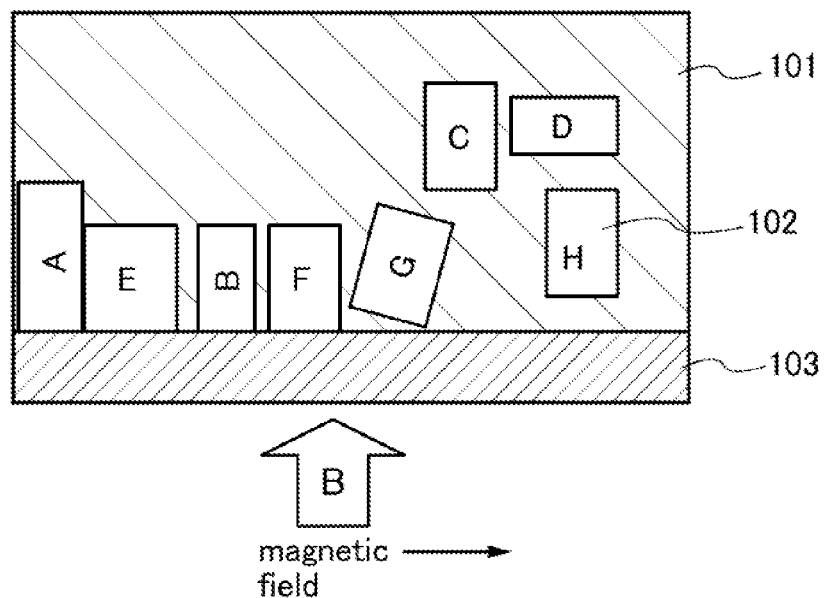
Figure 2C:
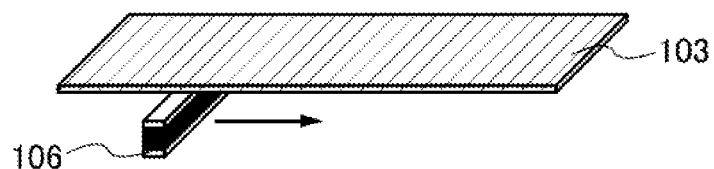
Figure 3A:
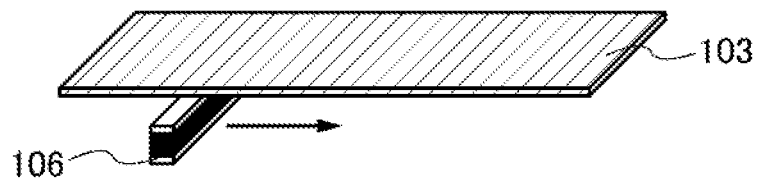
FIGS. 3A and 3B illustrate means for aggregating active material particles.
Figure 3B:
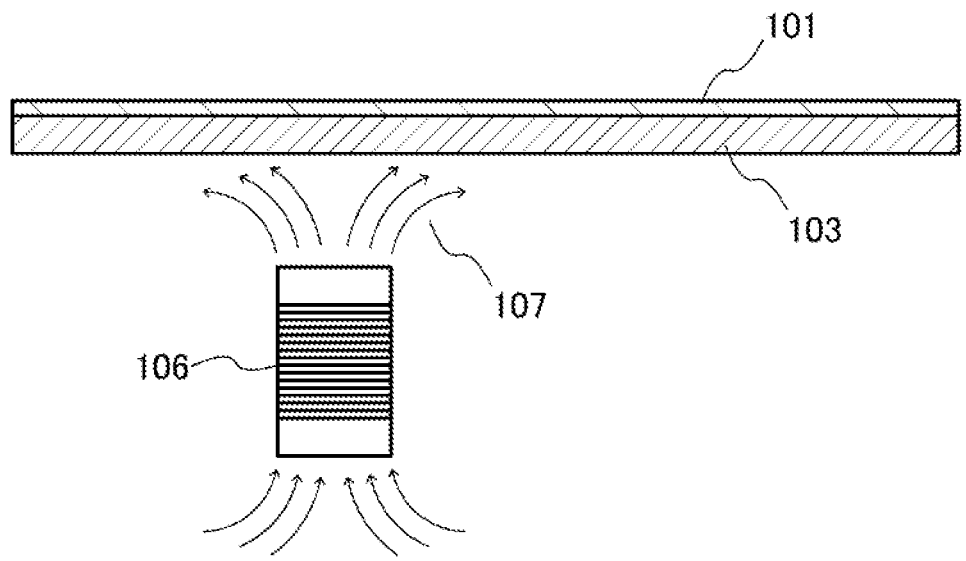

Hereinafter, embodiments will be described with reference to drawings. However, the embodiments can be implemented in various modes. It will be readily appreciated by those skilled in the art that the modes and details can be changed in various ways without departing from the spirit and scope of the present invention. Therefore, the present invention should not be construed as being limited to the following descriptions of the embodiments.

(Embodiment 1)

In this embodiment, description will be given of a method for manufacturing a lithium ion secondary battery according to one embodiment of the present invention. The average value of the sizes of positive electrode active material particles is 5 nm to 50 nm, preferably 5 nm to 20 nm.

A solution method such as a hydrothermal method may be employed for forming positive electrode active material particles other than a solid phase reaction method. For example, when lithium iron phosphate is formed by a hydrothermal method, iron chloride, ammonium phosphate, lithium hydroxide, or a hydrate of any of these is preferably used as a starting material.

In particular, the positive electrode active material particles preferably consist of single crystals in order to obtain effects of the present invention sufficiently, and therefore a hydrothermal method is preferably employed. Further, a carbohydrate such as glucose may be mixed at the time of baking of the positive electrode active material particles so that the positive electrode active material particles are coated with carbon. This treatment can improve the electric conductivity. However, carbon coating is unnecessary when the positive electrode active material particles are sufficiently fine.

The positive electrode active material particles obtained in such a manner, a binder, and an electrolyte are mixed to form a slurry. The electrolyte in which $LiPF_6$ is dissolved in a mixed solvent of ethylene carbonate (EC) and diethyl carbonate (DEC) is preferably used; however, one embodiment of the present invention is not limited thereto.

Then, a positive electrode collector is coated with the slurry and is left in a magnetic field for two seconds to an hour. Alternatively, the slurry may be applied to the positive electrode collector in a magnetic field. The intensity of a magnetic field on the top surface of the positive electrode collector is 0.01 T to 2 T. For the positive electrode collector, a metal material including aluminum as its main component is preferably used. Further, the positive electrode collector preferably includes a transition metal with high magnetic susceptibility such as iron, nickel, or cobalt and lanthanoid such as ytterbium or dysprosium at a total concentration of 1 at % or less.

The positive electrode active material particles are drawn to the positive electrode collector and aggregate over the collector, so that almost no active material particles are in an upper layer portion of the slurry; therefore, the upper layer portion of the slurry is removed. Then, the slurry is dried. Thus, a positive electrode is completed. With the use of the positive electrode manufactured in such a manner, a lithium ion battery can be manufactured.

Figure 4:
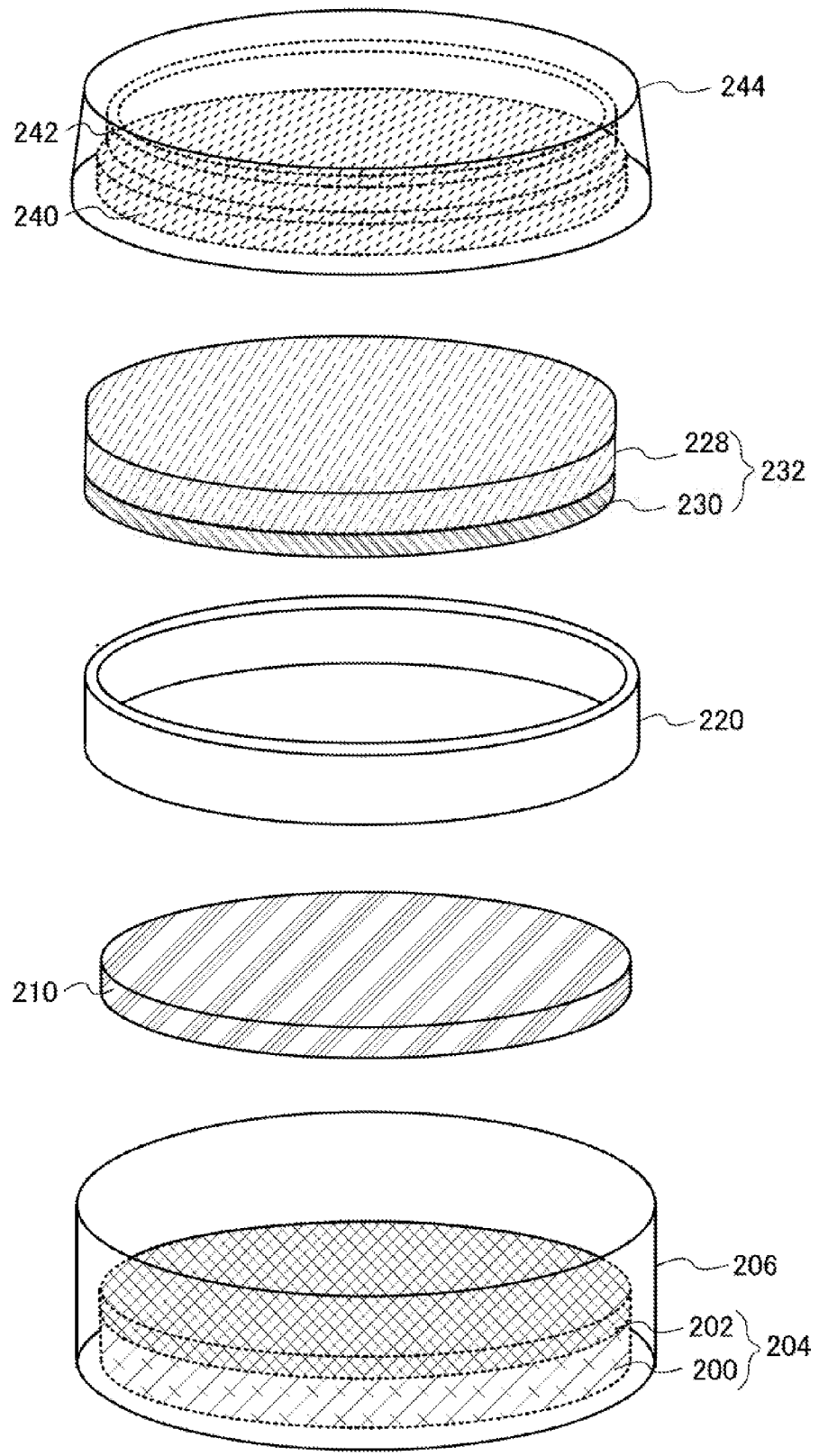
FIG. 4 illustrates an example of a secondary battery.

Description will be given below with reference to FIG. 4. FIG. 4 is a schematic view illustrating the structure of a coin-type secondary battery. A positive electrode 232 includes a positive electrode collector 228 and a positive electrode active material layer 230 formed by the above method (the positive electrode active material layer 230 including aggregating positive electrode active material particles, an electrolyte, and a binder).

As illustrated in FIG. 4, the coin-type secondary battery includes a negative electrode 204, a positive electrode 232, a separator 210, an electrolyte (not illustrated), a housing 206, and a housing 244. Besides, the coin-type secondary battery includes a ring-shaped insulator 220, a spacer 240, and a washer 242. As the positive electrode 232, the electrode that is obtained by forming the positive electrode active material layer 230 over the positive electrode collector 228 through the above process is used.

An electrolyte in which $LiPF_6$ is dissolved in a mixed solvent of ethylene carbonate (EC) and diethyl carbonate (DEC) is preferably used; however, one embodiment of the present invention is not limited thereto.

The negative electrode 204 includes a negative electrode active material layer 202 over a negative electrode collector 200. As the negative electrode collector 200, copper is preferably used, for example. As a negative electrode active material, graphite, polyacene, or the like is used. The negative electrode active material layer 202 is preferably formed using such a material alone or a mixture of the material and a binder.

An insulator with pores (e.g., polypropylene) may be used for the separator 210. Alternatively, a solid electrolyte which can transmit lithium ions may be used.

The housing 206, the housing 244, the spacer 240, and the washer 242 each of which is made of metal (e.g., stainless steel) are preferably used. The housing 206 and the housing 244 have a function of electrically connecting the negative electrode 204 and the positive electrode 232 to the outside.

The negative electrode 204, the positive electrode 232, and the separator 210 are soaked in the electrolyte. Then, as illustrated in FIG. 4, the negative electrode 204, the separator 210, the ring-shaped insulator 220, the positive electrode 232, the spacer 240, the washer 242, and the housing 244 are stacked in this order inside the housing 206, and the housing 206 and the housing 244 are subjected to pressure bonding. In such a manner, the coin-type secondary battery is manufactured.

(Embodiment 2)

As examples of electric devices according to embodiments of the present invention, a variety of dry batteries, a variety of storage batteries, and the like are given. As positive electrodes thereof, for example, the ones manufactured by the method described in Embodiment 1 may be used.

As examples of electric devices according to embodiments of the present invention, electric vehicles, electric power tools, personal computers, mobile phones, and the like are given. Such electric devices are not always supplied with power through wires and thus are provided with storage batteries inside. As positive electrodes of the storage batteries, for example, the ones manufactured by the method described in Embodiment 1 may be used.

In particular, storage batteries with low internal resistance are needed for applications where a large amount of current needs to be fed even momentarily or where a required current value varies greatly. Therefore, a sufficient effect can be obtained by using one embodiment of the present invention.

This application is based on Japanese Patent Application serial no. 2011-002257 filed with the Japan Patent Office on Jan. 7, 2011, the entire contents of which are hereby incorporated by reference.

What is claimed is:

1. A method for manufacturing a nonaqueous electrolyte secondary battery, comprising:
    forming a slurry including active material particles of an oxide, a binder and a conduction auxiliary agent, wherein each of the active material particles comprises a transition metal, and an average value of cube roots of volume of each of the active material particles is 5 nm to 50 nm;
    applying the slurry to a surface of a current collector;
    exposing the current collector coated with the slurry to a non-uniform magnetic field to separate the slurry into a first portion of the slurry that includes the binder and the conduction auxiliary agent, and does not substantially include the active material particles and a second portion of the slurry that contains most of the active material particles and is located between the current collector and the first portion of the slurry; and
    selectively removing the first portion of the slurry,
    wherein a maximum of the non-uniform magnetic field at the surface of the current collector is 0.01 T to 2 T, and
    wherein the step of selectively removing the first portion of the slurry is followed by a step of drying the second portion of the slurry.

2. The method for manufacturing a nonaqueous electrolyte secondary battery, according to claim 1,
    wherein each of the active material particles comprises iron, and has an olivine structure.

3. The method for manufacturing a nonaqueous electrolyte secondary battery, according to claim 1,
    wherein surfaces of the active material particles are coated with carbon.

4. The method for manufacturing a nonaqueous electrolyte secondary battery, according to claim 1,
    wherein 60% or more of the active material particles consist of single crystals.

5. A method for manufacturing a nonaqueous electrolyte secondary battery, comprising:
    forming a slurry including active material particles of an oxide, a binder and a conduction auxiliary agent, wherein each of the active material particles comprises a transition metal, and an average value of cube roots of volume of each of the active material particles is 5 nm to 50 nm;

applying the slurry to a surface of a current collector in a non-uniform magnetic field; and selectively removing a first portion of the slurry, wherein the first portion of the slurry includes the binder and the conduction auxiliary agent, does not substantially include the active material particles, wherein the first portion of the slurry is located on a second portion of the slurry that contains most of the active material particles and is located between the current collector and the first portion of the slurry, wherein a maximum of the non-uniform magnetic field at the surface of the current collector is 0.01 T to 2 T, and wherein the step of selectively removing the first portion of the slurry is followed by a step of drying the second portion of the slurry.

6. The method for manufacturing a nonaqueous electrolyte secondary battery, according to claim 5, wherein each of the active material particles comprises iron, and has an olivine structure.

7. The method for manufacturing a nonaqueous electrolyte secondary battery, according to claim 5, wherein surfaces of the active material particles are coated with carbon.

8. The method for manufacturing a nonaqueous electrolyte secondary battery, according to claim 5, wherein 60% or more of the active material particles consist of single crystals.

9. A method for manufacturing a nonaqueous electrolyte secondary battery, comprising:

forming a slurry including active material particles of an oxide, a binder and a conduction auxiliary agent, wherein each of the active material particles comprises a transition metal, and an average value of cube roots of volume of each of the active material particles is 5 nm to 50 nm;

applying the slurry to one surface of a surface of a current collector;

scanning the current collector with a non-uniform magnetic field, in order to separate the slurry into a first portion of the slurry that includes the binder and the conduction auxiliary agent, and does not substantially include the active material particles and a second portion of the slurry that contains most of the active material particles and is located between the current collector and the first portion of the slurry; and selectively removing the first portion of the slurry, wherein a maximum of the non-uniform magnetic field at the surface of the current collector is 0.01 T to 2 T, and wherein the step of selectively removing the first portion of the slurry is followed by a step of drying the second portion of the slurry.

10. The method for manufacturing a nonaqueous electrolyte secondary battery, according to claim 9, wherein each of the active material particles comprises iron, and has an olivine structure.

11. The method for manufacturing a nonaqueous electrolyte secondary battery, according to claim 9, wherein surfaces of the active material particles are coated with carbon.

12. The method for manufacturing a nonaqueous electrolyte secondary battery, according to claim 9, wherein 60% or more of the active material particles consist of single crystals.

* * * * *